Aug. 5, 1958   E. J. KELLY ET AL   2,846,318
METHOD OF RAPID COOLING WITH MINIMAL DEHYDRATION
Filed Aug. 30, 1954
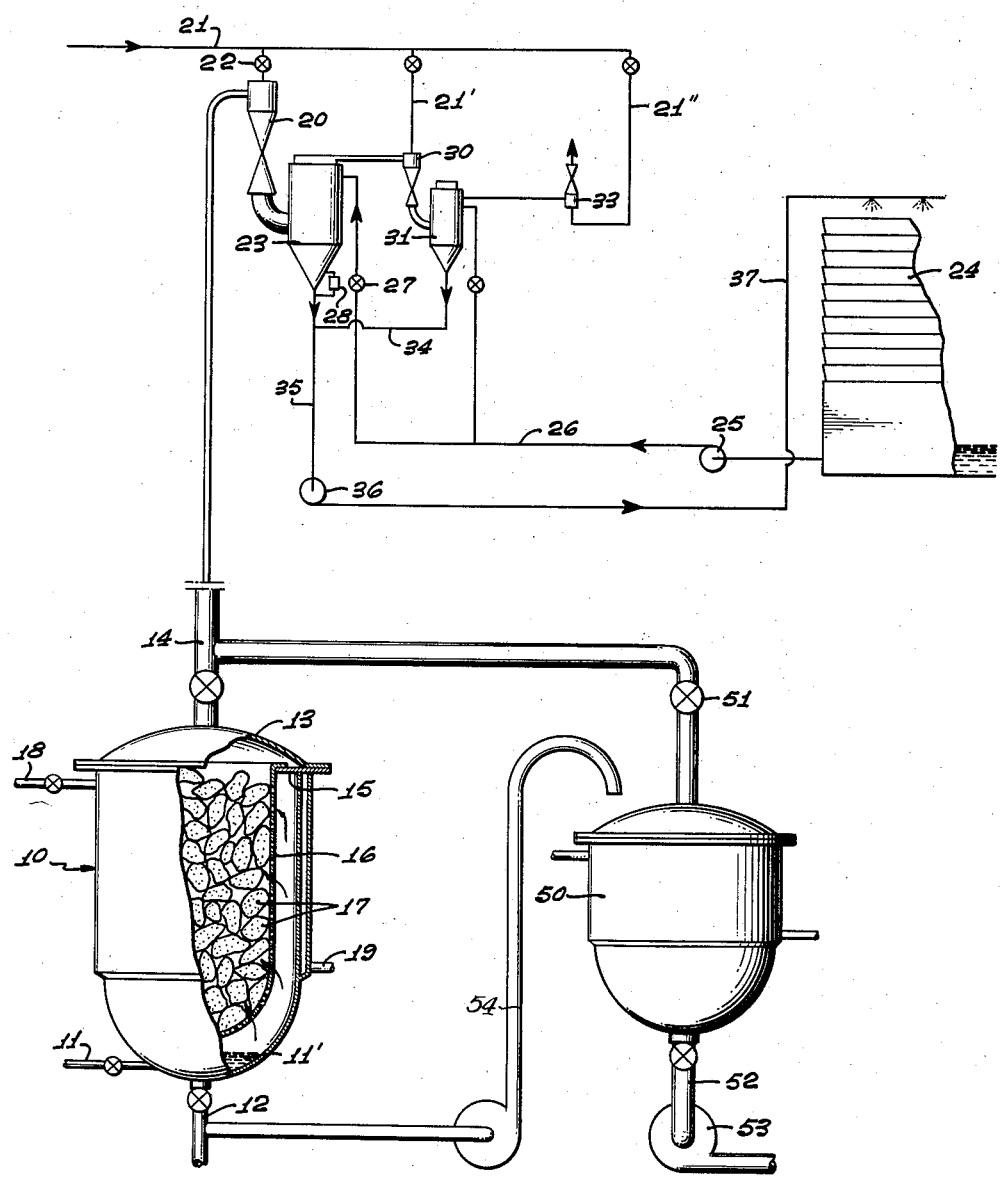
EDGAR J. KELLY
ALFRED H. SCHLEMMER
INVENTORS.
BY
ATTORNEY.

United States Patent Office 2,846,318
Patented Aug. 5, 1958

2,846,318

METHOD OF RAPID COOLING WITH MINIMAL DEHYDRATION

Edgar J. Kelly, Placentia, and Alfred H. Schlemmer, Gardena, Calif., assignors to E. J. Kelly & Associates, Inc., Los Angeles, Calif., a corporation of California Application August 30, 1954, Serial No. 453,034

15 Claims. (Cl. 99—192)

The present invention relates to improved methods of rapidly chilling food products without appreciable dehydration thereof, and is also directed to methods of cooking and chilling food products, particularly proteinous material in the same container whereby the character of the cooked material is improved, spoilage is inhibited and the entire operation rendered much more economical.

The methods of the present invention are directed to various food products capable of being treated in accordance with the methods hereinafter described in detail. The methods are particularly adapted for use on proteinous food products, such as meat, fowl and fish, food products containing proteinous material, such as stews, curries, roasts and the like, food products which are either completely cooked or partially cooked and then rapidly chilled and frozen for sale as partly prepared frozen food products made ready for the table by but a brief heating. In addition, the methods of the present invention are applicable to fresh vegetables, such as lettuce, melons, tomatoes and the like which, immediately after picking (and with or without precooling), need be rapidly chilled in order to reduce the temperature of the fruit or vegetable to remove the natural field heat therefrom and prepare the fruit or vegetable for shipment to distant points.

It is recognized that in the treatment of fresh fruits and vegetables, such as for example lettuce, it has been common practice to subject field-picked lettuce to a vacuum treatment prior to placement of the lettuce in refrigerated cars for shipment to distant points, but these prior precooling methods depended upon the application of vacuum to the field-picked lettuce and the withdrawal of an appreciable amount of water from the cellular structure thereof, this withdrawal of water resulting in a rapid reduction in temperature to say 35° F. However, the withdrawal of moisture from the fibers and leaves caused the lettuce to wilt and assume a most unsatisfactory and almost unsaleable appearance, since the purchaser is only interested in purchasing a crisp head of lettuce and not a wilted head.

The present invention distinguishes from prior vacuum cooling methods in that a rapid chilling or cooling is obtained without dehydration of the product being chilled. Generally stated, the method comprises generating a low temperature, saturated water vapor at low absolute pressure in a generating zone and then passing a current of such low temperature, saturated water vapor over the surface of the product which is to be chilled. Preferably the saturated water vapor contains entrained droplets of water which contact the surface of the product being chilled and vaporize on such surface, heat being given off by the product to the impinging droplets to cause their evaporation. The method also contemplates steps of controlling the velocity of the saturated water vapor so as to permit the cooling or chilling to take place within a remarkably short period of time.

It is evident, therefore, that the methods of the present invention are applicable to many solid or semi-solid objects or products although, as previously stated, food products and particularly proteinous foods and materials are exceptionally well adapted to treatment in the manner hereinafter disclosed.

In addition to the attainment of a rapid drop in temperature without appreciable dehydration of the product being treated, secondary advantages are obtained, such as improvement in texture and quality, as will be described in greater detail hereinafter.

It is an object of the present invention, therefore, to disclose and provide means and methods whereby various solid and semi-solid products or objects can be rapidly cooled or chilled without appreciable dehydration of said products or objects.

A further object of the invention is to disclose and provide a method of rapidly chilling solid proteinous material without dehydration thereof, the rapid chilling eliminating the possibility of spoilage which normally exists when proteinous material is maintained at temperatures above 90° F. for a protracted period of time.

Furthermore, an object of the present invention is to disclose and provide means and methods whereby cooling or chilling may be attained within compact equipment and without high capital investment in equipment and facilities, such as mechanical refrigeration equipment normally employed in freezer and chilling rooms.

These and various other objects, uses and advantages of the present invention will become apparent to those skilled in this art from the following description of an exemplary arrangement of apparatus and methods of procedure. For purposes of illustration, reference will be had to the appended drawings in which an arrangement of elements adapted for use in the processing of fowl is diagrammatically shown.

As it was previously indicated, the methods of the present invention are applicable to many objects and food products. The application of the methods hereof to the treatment of fowl in the production of frozen poultry pies will adequately illustrate the methods, the adaptation of the methods to other food products becoming apparent from a contemplation of this example.

In the manufacture of frozen poultry pies, it has been customary to pick and eviscerate fowl and cook them in a large steam jacketed kettle. Although the fowl was placed into the kettles in whole condition, the cooking operation generally resulted in a partial disintegration of the fowl, a material quantity of meat being found in the bottom of the kettle at the completion of the cooking operation. The fowl was then removed from the liquid broth resulting from the cooking operation and placed into a refrigerated room (chilled by externally supplied refrigeration) in order to be chilled or cooled prior to deboning. Attempts to debone the fowl while hot is inefficient and shreds or strings of meat are obtained instead of large chunks. The freezer rooms, although maintained at low temperature, were incapable of chilling the cooked fowl to a suitable low temperature, say a temperature of 60° F. in less than about 12 hours and generally 14–18 hours. It is evident that maintenance of cooked meat, such as the fowl, in a freezer room for a protracted period of time, such as 12–18 hours, results in a material dehydration of the fowl and grave possibility of bacterial spoilage exists due to the length of time that the fowl is maintained at a temperature above 85° to 90° F. It has been found that the chilling of cooked poultry in a freezer room for a protracted period of time is absolutely necessary in order to permit the inner portions of a cooked fowl to be chilled, As previously indicated, the broth in which the fowl had been cooked was then suitably spiced, flavored, mixed with roux and cooked or thickened to make a desired gravy.

After the chickens had been cooled to say 60° F., they were sent to a deboning room maintained at about 60° F. and the meat was removed from the carcasses. Prior to the installation of the method hereinafter disclosed, the deboning operation was time consuming and required a large number of operators. By reasons of the adherence of meat to the bones, relatively small pieces of meat were removed, then cut into smaller pieces and eventually added with the gravy to pies made from dough prepared in a refrigerated room and of proper texture. The filled pies were then moved into a sharp-freezer room and the frozen products suitably packaged.

It will be evident that the capacity of a plant operating in the above described manner was entirely dependent upon the number of freezing rooms (and capacity of mechanical refrigeration equipment) available for the purpose of cooling the cooked fowl, due to the length of time required to reduce the temperature of the fowl to a deboning temperature. This bottleneck is eliminated by the present invention in that the cooling of fowl cooked for 35 minutes at about 235° F. to a temperature of below 60° F. is attained within a period of 18–20 minutes.

The method of the present invention will be best understood by reference to the appended drawing wherein a vessel 10 is illustrated, this vessel being utilized in both cooking and chilling the fowl. The vessel may be steam jacketed, provided with a valved liquid inlet line 11 near the bottom thereof, a valved outlet line 12 at the bottom thereof, a removable cover 13 and a large diameter valved vapor line 14 communicating with the top of the vessel 10. An inwardly extending flange 15 is provided within the vessel adapted to receive and hold the upper lip of a foraminous basket 16 (preferably made from stainless steel or the like) in which the eviscerated and picked fowl 17 is contained. Preferably the volumetric capacity of the perforated basket or container 16 is not materially smaller than the volumetric capacity of the vessel 10. Means for admitting steam to the jacket of the vessel and removing condensate therefrom are indicated at 18 and 19 respectively, other details such as means for removably attaching the cover 13 to the vessel, adequate temperature indicating and recording devices and the like being not shown since their utilization and installation are known in the art.

The vapor line 14 is connected to any suitable source of vacuum. The invention is not limited to the type of equipment employed in generating vacuum. The apparatus illustrated comprises a multi-stage steam jet evacuator including a primary ejector 20 supplied with steam by line 21 and control valve 22, a first intercondenser 23 supplied with cooling water from the base of cooling tower 24 by pump 25 and line 26 having control valve 27 therein, said valve being controlled in accordance with the level of water in the bottom of condenser 23 by a float control 28, a second ejector 30 receiving vapor from the top of the first intercondenser 23, the second ejector 30 receiving steam through valved branch line 21' and discharging into a second intercondenser 31, and a third ejector 33 supplied with steam through valved branch line 21''. Condensate from the second intercondenser may be discharged by line 34 and mixed with the condensate from the first intercondenser discharged through line 35 and pumped by pump 36 and line 37 into the cooling tower 24.

A vacuum cooker for handling and preparing the broth and gravy is indicated at 50 and may also be connected as by valved line 51 to the vacuum line 14. The vacuum cooker 50 may discharge by line 52 to a pump 53 which supplies the properly seasoned gravy to the pie-filling unit, not shown.

The equipment illustrated may be used in the following manner: The picked and eviscerated fowl 17 is placed in the foraminous basket 16 and the basket is suspended within the vessel 10. Steam is supplied to the jacket, and adequate amount of seasoned water is added and the fowl is cooked under pressure for a desired length of time. In practice, 35 minutes at 235° F. is adequate. It will be evident that during such cooking the valve leading to the vacuum line 14 is closed. At the end of such cooking, fat may be skimmed off the top of the liquid in the cooking vessel through a suitable drain port and valve 12 is opened so as to permit the broth to be pumped by line 54 into the vacuum cooker 50. Valve 12 is then closed and water is admitted to the bottom of the vessel 10 through valved line 11, this water being at a temperature above the minimum temperature desired within the vessel 10. The supply of steam to the jacket may be discontinued in the interest of economy, although the chilling process is so effective that this can be overlooked. The valved line leading to the source of vacuum is now opened so as to generate a low temperature, saturated water vapor from the body of water 11' in the bottom of the vessel. Saturated water vapor at a low absolute pressure is therefore rapidly generated in the generating zone below the container or basket 16 and a current of such low temperature, saturated water vapor passes through the perforations of the basket and over the surfaces of the fowl contained therein. It is to be noted that the chilling of the fowl is attained solely by the low-temperature, saturated vapor generated within the vessel 10 by the vacuum, without resort to externally applied refrigeration, such as cooling coils connected to mechanical refrigeration equipment and the transfer of heat through such coils.

Since the water in the generating zone is actually flashed into vapor, a considerable amount of water is entrained in the form of fine droplets in the current of vapor and these entrained droplets upon impinging the surfaces of the fowl are vaporized by the internal heat of the fowl.

It is desired to maintain the current of saturated low temperature vapor at a high velocity. For this reason, as previously stated, the volumetric capacity of the basket 16 is not materially smaller than the volumetric capacity of the vessel 10 and the vapor passes at high velocity through the basket, direct movement of the vapor into vacuum line 14 being inhibited by the inwardly extending flange 15. It is to be remembered that one pound of water generates 1,703 cubic feet of saturated water vapor at an absolute pressure of 9.2 mm. of mercury and has a temperature of 50° F. This tremendously large volume of vapor from a very small volume of water creates a very high velocity through the basket and permits, at the absolute pressure indicated, to chill 1,000 pounds of cooked poultry from a temperature of 235° F. to a temperature of about 60° F. in a period of about 20 minutes.

Attention is specifically called to the fact that during this rapid chilling, the fowl itself is not dehydrated. Not only is the current of vapor saturated, but in addition contains an appreciable quantity of entrained droplets of water. Makeup water is supplied to the body 11' during the process so as to insure the presence of entrained droplets of water. As long as the water vapor is saturated and contains such entrained droplets of water, virtually no dehydration of the fowl 17 takes place. Moreover, as previously indicated, the absorption of heat from the fowl is expedited by such entrained water, the fowl giving up its internal heat for the purpose of evaporating the entrained droplets as they impinge on the surfaces of the fowl.

At the conclusion of the cooling step, the application of vacuum is discontinued and the entire wire basket or container 16 together with its now chilled fowl is transferred to the boning room.

One of the important advantages of the method herein disclosed lies in that the boning is greatly expedited. The meat of the fowl appears to be thoroughly cooked and in addition readily separable from the bones; it literally falls off the bones. As a result a smaller number of operators can debone a much larger poundage of fowl and obtain the meat in large pieces capable of being diced or cubed into attractive, coherent, appetizing and flavorful pieces, particularly well adapted for use in pies. The pies are therefore free from strings or strips of meat and have enhanced saleability.

Another important advantage of the present method is that the quick cooling does not destroy the marrow in the bones. Subsequent to the removal of the meat, the bones are often used in manufacturing a broth. Heretofore prolonged cooking and cooling substantially liquefied the marrow and rendered it unavailable as an ingredient in the broth or gravy.

The thickening of the broth and the manufacture of the gravy is also expedited by conducting these operations in a vacuum cooker 50, vacuum being applied to such cooker by operation of valve 51.

For purposes of economy and in order to attain most rapid chilling, it is desirable to generate saturated water vapor at a temperature of from 10° to 15° lower than the minimum temperature to which the product being chilled is to be cooled. The maintenance of such differential also insures elimination of undesired dehydration. The relationship between absolute pressure, temperature of saturated water vapor obtained at such pressure, and the number of cubic feed per pound of water evaporated at such low absolute pressure is indicated in the following tabulation:

| Absolute Pressure, mm. Hg | Temperature Sautrated Vapor, °F. | Volume Per Lb. of Water, cu. ft. |
|---|---|---|
| 6.29 | 40 | 2,444 |
| 9.2 | 50 | 1,703 |
| 18.78 | 70 | 868 |
| 49.09 | 100 | 350 |

Attention is again drawn to the volume of water vapor generated in the performance of this method. It will be recognized that comparable cooling could not be obtained by the utilization of a blast of cold air since the cold air would be in a dehumidified state which would tend to dehydrate the material being cooled and to obtain the same velocities of gas past the material being cooled would require tremenodusly large equipment and uneconomically high horsepower. The velocities obtained by the instant method, however, are far in excess of those which could be obtained mechanically and the gas current being handled is a saturated water vapor that will not dehydrate. The importance of the entrained water present in the separately generated saturated water vapor of the instant invention cannot be overemphasized; water at a temperature of 50° F. and an absolute pressure of 9.2 mm. Hg has a latent heat of evaporation of 1,065.6 B. t. u.'s per pound, indicating the great heat removal capacity of a small amount of entrained water.

The essentials of the process are evident from the above example and the applicability of the process to the treatment of other materials is readily apparent. The process is applicable to treatment of tuna and other fish which are cooked and chilled and to other prepared foodstuffs. The process permits cooking of foodstuffs to be terminated quickly inhibiting the cellular degeneration and changes (which impair flavor and texture) which normally occur during a protracted cooling period. The process is applicable to uncooked, freshly killed animals and fowl for the purpose of removing body heat and to freshly picked or harvested vegetables and fruit.

The equipment employed may vary with the character and condition of the material being treated and the extent which chilling is to be obtained. When a vacuum system such as has been described here is employed, it can be operated in stages with attendant flexibility, and by controlling the condensers the velocity of the cold saturated vapors may be varied. A single generating zone (in which cold saturated water vapor is generated) may be used in selectively supplying any one or more of a plurality of chambers in which the materials to be treated are placed and from which they are removed, thus permitting the vacuum system to operate continuously while successively treating batches of material. Generally the operations are conducted with absolute pressures of between about 6 and 20 mm. of Hg, and the products chilled to 35°–65° F. and such chilling may be preliminary to subsequent freezing to temperatures below 30° F. in sharp-freezing rooms.

All changes coming within the appended claims are embraced thereby.

We claim:

1. In a method of rapidly chilling food products without appreciable dehydration thereof, the steps of: generating a low temperature, saturated water vapor at low absolute pressure in a generating zone; placing food to be chilled in a chilling zone; and passing a current of the low temperature, saturated water vapor generated in the generating zone over the surface of food in the chilling zone while maintaining a low absolute pressure in said chilling zone.

2. A method of the character stated in claim 1, including the step of controlling the velocity of said current of low temperature, saturated water vapor by regulating the condensation of said vapor after it has passed over the food.

3. In a method of rapidly chilling food products without appreciable dehydration thereof, the steps of: subjecting a body of water, at above minimum temperature desired, to a source of vacuum to produce a current of low temperature saturated water vapor containing entrained water droplets; and then passing such current of saturated vapor and entrained droplets at a subatmospheric pressure over the surface of food products to reduce the temperature of such food products with minimum dehydration thereof, the subatmospheric pressure being sufficient to maintain said current of saturated water vapor at a minimum temperature lower than that to which the food products are to be chilled.

4. In a method of the character stated in claim 3, the step of controlling the velocity of said vapor passing over the surface of food products by regulating the magnitude of vacuum.

5. In a method of the character stated in claim 3, the step of controlling the velocity of said vapor by regulating the condensation of said vapor after it has passed over the food products.

6. A method of cooking and chilling solid proteinous material which consists of: placing solid proteinous material in a cooking vessel; subjecting said proteinous material to heat sufficient to cook said material; draining and removing liquid products of said cooking from said vessel; introducing water at a temperature above the minimum desired into the lower portion of said vessel; connecting the upper portion of the vessel to a source of vacuum to form a saturated vapor containing entrained water droplets and passing said vapor at high velocity over the surface of the cooked materials in said vessel, the vacuum so applied being adapted to produce vapor at a temperature below that to which the cooked material is to be chilled.

7. The method as stated in claim 6 including the step of controlling the velocity of said vapor by regulating the magnitude of vacuum.

8. The method as stated in claim 6 including the step of controlling the velocity of said vapor by regulating the condensation of said vapor after it has passed over the food material.

9. The method as stated in claim 6 including the further step of removing the chilled material from said vessel after it has been chilled.

10. The method as stated in claim 6 wherein the vacuum is between about six and twenty millimeters of mercury.

11. A method as stated in claim 6 wherein the latent heat of evaporation of water droplets entrained in said vapor and contacting said food material is utilized in reducing the temperature of said food material, said material giving up its internal heat to impinging, entrained droplets to evaporate said droplets.

12. A method of rapidly chilling solid food materials which consists of: subjecting a body of water, at above minimum temperature desired, to a source of low absolute pressure to form a current of low temperature, saturated water vapor containing entrained droplets of water; placing food materials in a foraminous container; and then passing such current of saturated vapor and entrained droplets at a low absolute pressure through such container and into contact with surfaces of such food materials.

13. In a method of rapidly chilling cooked, solid, proteinous food material to a desired minimum temperature without appreciable dehydration thereof and without externally applied refrigeration, the steps of: placing food material to be chilled in a chilling zone; generating a large volume of saturated water vapor at a temperature lower than the minimum to which the food material is to be chilled, in a generating zone, by subjecting a body of water to subatmospheric pressure sufficient to generate water vapor at such lower temperature; and drawing the low-temperature, saturated water vapor from the generating zone into the chilling zone and over the surfaces of solid food material to be chilled in the chilling zone by withdrawing air and vapor from the chilling zone at a rate sufficient to maintain a subatmospheric pressure therein adapted to maintain said saturated water vapor at a temperature lower than said minimum.

14. A method as stated in claim 13 wherein the subatmospheric pressure is between 6 and 20 millimeters of mercury.

15. A method as stated in claim 13 wherein the low-temperature, saturated water vapor is drawn over the surfaces of food material for a time sufficient to chill the food material to a desired minimum temperature.

References Cited in the file of this patent

UNITED STATES PATENTS

| | | |
|---|---|---|
| 2,065,358 | Zarotschenzeff | Dec. 22, 1936 |
| 2,199,485 | De Vout | May 7, 1940 |
| 2,705,678 | Morrison | Apr. 5, 1955 |

OTHER REFERENCES

"The National Provisioner," Oct. 2, 1954, pp. 54, 55, 56, 58 and 83, article entitled Out of The Mists, A New Beef Chill.